(12) United States Patent
Mieville et al.

(10) Patent No.: US 12,059,094 B2
(45) Date of Patent: Aug. 13, 2024

(54) BEVERAGE PREPARATION METHOD

(71) Applicant: SOCIETE DES PRODUITS NESTLE S.A., Vevey (CH)

(72) Inventors: Yann Mieville, Pomy (CH);
Aleksandar Sekulic, Prilly (CH);
Fabien Rawyler, Saint-Aubin (CH);
Hugues Racine, Pontarlier (FR)

(73) Assignee: Societe des Produits Nestle S.A., Vevey (CH)

( * ) Notice: Subject to any disclaimer, the term of this patent is extended or adjusted under 35 U.S.C. 154(b) by 788 days.

(21) Appl. No.: 17/261,629

(22) PCT Filed: Jul. 22, 2019

(86) PCT No.: PCT/EP2019/069683
§ 371 (c)(1),
(2) Date: Jan. 20, 2021

(87) PCT Pub. No.: WO2020/020826
PCT Pub. Date: Jan. 30, 2020

(65) Prior Publication Data
US 2021/0338003 A1 Nov. 4, 2021

(30) Foreign Application Priority Data

Jul. 24, 2018 (EP) .................................. 18185114

(51) Int. Cl.
*A47J 31/40* (2006.01)
*A23F 5/40* (2006.01)
*A47J 31/00* (2006.01)

(52) U.S. Cl.
CPC .............. *A47J 31/401* (2013.01); *A23F 5/40* (2013.01); *A47J 31/002* (2013.01); *A47J 31/404* (2013.01)

(58) Field of Classification Search
CPC ....... A47J 31/401; A47J 31/002; A47J 31/404
See application file for complete search history.

(56) References Cited

U.S. PATENT DOCUMENTS

| 5,303,639 A | 4/1994 | Bunn et al. |
| 5,927,553 A | 7/1999 | Ford |
| 2014/0242226 A1 | 8/2014 | Büttiker |

FOREIGN PATENT DOCUMENTS

| CH | 701625 A1 | 2/2011 |
| CN | 2413599 Y | 1/2001 |

(Continued)

OTHER PUBLICATIONS

Chinese Office Action for Appl No. 2019800488321 dated Jul. 4, 2022.

(Continued)

*Primary Examiner* — Jenna A Watts
(74) *Attorney, Agent, or Firm* — K&L Gates LLP (57) ABSTRACT

The invention concerns a method for producing a beverage by dissolution of soluble beverage powder with water in a beverage preparation apparatus, —said apparatus comprising at least one chamber (1) for receiving and mixing a dose of soluble beverage powder with water, said chamber comprising : —an opened top to receive the dose of soluble beverage powder, and —a lateral side wall (11) said lateral side wall comprising a water inlet (2), and —a bottom wall (12), said bottom wall comprising a beverage outlet conduit (3), and —said method comprising the steps of: a) —introducing water through the water inlet (2) to wet the internal surface of the funnel of the bottom wall, then b) —stopping the introduction of water, then c) —introducing the dose of soluble beverage powder in the chamber, then d) —introducing water in the chamber to dissolve the powder.

14 Claims, 5 Drawing Sheets

(56) References Cited

FOREIGN PATENT DOCUMENTS

| | | |
|---|---|---|
| CN | 204670285 U | 9/2015 |
| EP | 0050312 A2 | 4/1982 |
| FR | 2699388 A1 | 6/1994 |
| GB | 1369218 A | 10/1974 |
| JP | S6187963 A | 5/1986 |
| JP | S63157865 A | 6/1988 |
| JP | 2002186557 A | 7/2002 |
| JP | 2013048897 A | 3/2013 |
| WO | 8502989 | 7/1985 |
| WO | 2008071613 | 6/2008 |
| WO | 2018121944 | 7/2018 |

OTHER PUBLICATIONS

Japanese Office Action for Appl No. 2021-503824 dated Apr. 25, 2023.

BEVERAGE PREPARATION METHOD

CROSS REFERENCE TO RELATED APPLICATIONS

The present application is a National Stage of International Application No. PCT/EP2019/069683, filed on Jul. 22, 2019, which claims priority to European Patent Application No. 18185114.8, filed on Jul. 24, 2018, the entire contents of which are being incorporated herein by reference.

FIELD OF THE INVENTION

The present invention relates to beverage dispensers preparing beverages from a soluble beverage powder and in which a dose of said powder is mixed with a water in a mixing chamber.

BACKGROUND OF THE INVENTION

WO 2008/071613 describes a beverage preparation machine comprising a mixing chamber for preparing frothed beverages wherein a dose of a beverage soluble powder is mixed with a water. This mixing chamber presents the great advantage of being devoid of any agitating device driven by a motor, like an impeller or a whipper. The agitation, dissolution and frothing is obtained by the force of water jet introduced inside the chamber only. As a result, the manufacturing cost of the machine is low.

Such a mixing chamber is particularly adapted for preparing a frothed coffee beverage from soluble instant coffee. The process of preparation consists in introducing a dose of coffee powder inside the chamber and then introducing water to dissolve the powder. The mixing chamber provides sufficient agitation with the water to dissolve and froth the coffee.

If it is desired to produce a beverage comprising milk where milk is prepared from soluble milk powder with such a chamber, the chamber should present some particular characteristics.

First, a milk beverage such as a coffee latte or a cappuccino requires a certain volume of milk, generally of about 100 ml of milk or even bigger. It is much more than the volume for preparing a coffee espresso that is about 60 ml. It means that the chamber must be designed to dissolve and froth a larger volume of water and to be able to dispense the beverage rapidly, precisely by means of a large beverage outlet.

In addition, it is strongly advisable to design the bottom wall of the chamber with a funnel shape sufficiently inclined in respect of horizontal in direction of the beverage outlet in order to facilitate the full dispensing of the large quantity milk as fast as possible.

Yet, by implementing such a chamber, a drawback rose when milk powders of high flowability were used. This type of powders are frequently used in beverage preparation machines because the powders are stored in a milk powder tank from which doses are dispensed by means of a dosing unit. To improve dosing consistency, milk powder of high flowability are preferred, for example powders comprising additives like $SiO_2$ or $CaCO_3$.

With a mixing chamber such as described above, it has been observed that, when no beverage has been prepared for a long time (for example the first cup of the day), and consequently the mixing chamber is dry, a dose of milk powder with high flowability flows straight away along the funnel shaped bottom of the chamber and then through the large beverage conduit out of the mixing chamber and is dispensed as such inside the drinking receptacle positioned downstream. It is not acceptable.

A solution to solve this problem may be to use a clamping device to close or open the beverage outlet. With such a clamping device, it is possible to close the outlet of the mixing chamber during the dosing of powder and as long as the beverage preparation is not finished; in addition, simultaneously a large outlet can be designed to rapidly dispense the beverage once ready. Yet such a clamping device must be actuated by a motor with a direct impact on the cost of the machine.

There is a need for providing a beverage apparatus which enables the preparation of an important volume of beverage from a soluble beverage powder presenting high flowability with a mixing chamber devoid of motor.

SUMMARY OF THE INVENTION

There is provided a method for producing a beverage by dissolution of soluble beverage powder with water in a beverage preparation apparatus,
the apparatus comprising at least one chamber to receive and mix a dose of soluble beverage powder with water, said chamber comprising:
an opened top to receive the dose of soluble beverage powder, and
a lateral side wall said lateral side wall comprising a water inlet, and
a bottom wall, said bottom wall comprising a beverage outlet conduit, and
wherein the water inlet and the internal shape of the chamber are configured so that water introduced through the water inlet is able to form a swirl inside the chamber, and
wherein the bottom wall presents the shape of a funnel inclined in direction of the beverage outlet conduit, and
wherein said beverage outlet conduit presents a hydraulic diameter of at least 5 mm, and
wherein said funnel is inclined by an angle of at least 30° with horizontal. and,
the method comprising the steps of:
a) introducing water through the water inlet in order to wet the internal surface of the funnel of the bottom wall, then
b) stopping the introduction of water, then
c) introducing a dose of soluble beverage powder in the chamber, then
d) introducing water in the chamber to dissolve the powder.

The chamber used in the method comprises a lateral side wall. Preferably, the chamber is positioned in the apparatus so that the lateral side wall is substantially vertical. The lower part of the lateral side wall is essentially cylindrical. The rest of the lateral side wall can be cylindrical too or can open out to increase the horizontal cross section of the chamber. Usually, in the upper part, the cross section presents a curved shape close to a circular section.

Usually the top of the chamber is at least partially opened. Soluble beverage powder can be introduced in the chamber through the opened top by gravity fall.

The lateral side wall comprises the water inlet.

The water inlet and the internal shape of the chamber are configured so that water introduced through the water inlet is able to form a swirl inside the chamber.

Preferably this water inlet is positioned in the lower part of the chamber that is essentially cylindrical. Accordingly the chamber is filled with water from the bottom.

The water inlet is configured so that the water is introduced in the chamber under the form a straight jet of water. By jet, it is understood a stream of water that comes out of the water inlet and in the chamber quickly and with force. Accordingly, the water inlet is configured for introducing water in the inner chamber with a high velocity. Usually, this straight jet is produced by and emerges from a nozzle positioned in the water inlet of the lateral wall of the chamber. Accordingly, the water inlet preferably comprises a nozzle.

According to a less preferred embodiment, the nozzle can be designed inside the cylindrical lateral side wall. Consequently, the chamber and the nozzle can be made of one single piece of material.

The size of the water nozzle outlet, the diameter of the chamber and the pressure of the water are generally adapted accordingly to get the high velocity of the jet and the swirling effect for water.

Generally, the nozzle presents an outlet section with a surface area equivalent to the surface of a circular surface of diameter comprised between 0,2 and 0,8 mm, preferably between 0,3 and 0,6 mm and even more preferably of about 0,5 mm.

With such a dimension, the delivery of water at a pressure comprised between 2 and 10 bar, preferably between 4 and 7 bar, in the nozzle enables the production of a jet of high velocity and the production of a swirl in the chamber.

Optionally, a second water inlet can be placed near the top of the chamber. It aims at introducing further water in the case the chamber would be used for producing a beverage with no foam. It enables a final rinsing of the chamber too.

Preferably, the water inlet is also oriented so that the straight jet of water extends transversely through the internal volume of the chamber along a line L, said line L being offset relative to the longitudinal central axis of the chamber.

More specifically, the line L is oriented in a direction so that a ratio $d/r_0$ is comprised between 0,2 and 0,4, preferably is of about 0,3, where $r_0$ is the radius of the cylindrical lateral side wall of the chamber and d is the distance measured orthogonally from the line L to the central longitudinal axis of the chamber, this configuration improves the dissolution of the powder.

Generally, the apparatus comprises a water supply system connectable to the water inlet. Water can be supplied either hot or cold. Generally the water supply system of the beverage production machine comprises at least a water tank or water supply, a water pump, a water heater and/or cooler and a valve for actuating the water delivery. The system can also comprise a selection valve for delivering water at either hot or cold temperature.

The bottom wall of the chamber is positioned below the lateral wall and, accordingly, the water inlet is positioned above the bottom wall. The bottom wall of the chamber presents the shape of a funnel inclined in direction of the beverage outlet conduit. As a result, the bottom wall is inclined in respect of horizontal in direction of the beverage outlet in order to facilitate the full dispensing of the beverage. Usually, the bottom wall is inclined by an angle of at least 30° with horizontal, preferably comprised between 30 and 60°.

Generally, the beverage outlet is a conduit, preferably vertically oriented. The beverage outlet conduit usually presents a circular cross section, yet other shape can be implemented like oval shape. The conduit is preferably at least partially straight. The beverage outlet can comprise several successive conduits with decreasing cross sections.

The cross section of the conduit is sufficiently large to enable the rapid dispensing of a large quantity of the beverage. Preferably, the hydraulic diameter of the conduit of the beverage outlet is of at least 5 mm. By hydraulic diameter, it is meant the diameter of a conduit with round-shaped section presenting the same cross section area as the conduit with a section of a different shape.

Preferably, the cross section of the conduit is subdivided in at least two, even more preferably four straight equal sub-conduits.

According to the preferred embodiment, the cross section of the conduit can be subdivided by a removable divider extending longitudinally through the main conduit. This removable property enables a thorough cleaning of the divider and the conduit. Preferably, a rod is attached to the removable divider, said rod extending to the top of the chamber when the divider is positioned inside the conduit. This rod facilitates the removal of the divider from the conduit by the operator.

Preferably the divider presents the shape of a cross dividing the cross section of the conduit in four equal channels.

A specific effect of this divider is that it prevents the rotation of the swirling beverage inside the beverage conduit. Swirling beverage is not desired in the conduit because it presents drawbacks such as:
  slowing down the dispensing, and
  splashing in place of dispensing a straight flow of beverage in the drinking receptacle .

Usually the internal volume defined by the walls of the chamber is sufficient to enable the preparation of a large volume of beverage and to dispense this beverage rapidly. In the preferred embodiment, the method applies to a chamber presenting an internal volume of at least 100 ml and wherein the hydraulic diameter $D_0$ of the conduit of the beverage outlet is of at least 5 mm.

The outlet conduit is opened. The outlet conduit is deprived of any closing means.

According to one embodiment, the position of the beverage outlet can be offset from the longitudinal central axis of the cylindrical lateral side wall of the chamber. Such an embodiment is preferred in a beverage preparation apparatus comprising at least two chambers, and wherein the beverage outlets of the chambers emerge in the same area. Such multiple chambers are used for the preparation of drinks comprising several beverage components such as coffee and foamed milk, both beverages being introduced in the same drinking receptacle.

In order to prepare a beverage with the above described chamber, the method comprises the first steps of a) introducing water through the water inlet in order to wet the internal surface of the funnel of the bottom wall and then b) stopping the introduction of water.

During this wetting step a), water is introduced through the water inlet at a flow rate configured to create a swirl of water along the internal surface of the funnel of the bottom wall. This swirl leaves a film of water on the surface of the funnel shape. Preferably, water is introduced in a quantity enabling the wetting of the internal surface of the funnel of the bottom wall only. The quantity of water introduced during step a) is configured to essentially moisten the internal surface and to avoid that drops of water flow out of the beverage conduit in a drinking receptacle positioned under the beverage outlet conduit.

Before the second step c) of powder dosing is implemented, the introduction of water is stopped (step b)).

For a chamber with a bottom wall presenting the shape of a circular funnel, said funnel presenting a largest diameter of about 50 mm and a height about 10 mm, a quantity of water introduced to wet the surface of about 2 ml is sufficient.

In the second dosing step, a dose of soluble beverage powder is introduced through the top opening of the chamber. Powder reaching the bottom wall does not slide on the wet surface of the chamber because as soon as powder contacts the bottom wall, powder reacts with the film of water spread on the internal surface and forms a layer of wet powder. The rest of the powder falling above this first layer of powder covering the surface of the funnel is retained on said first layer and is prevented from falling lower in direction of the conduit.

If a divider is present inside the beverage conduit, the sliding effect of the powder is even more reduced.

In a third dissolution step, water is introduced in the chamber to dissolve the beverage powder. Preferably water is introduced in the chamber at a flow rate configured to create an ascending swirl of water.

Preferably, the powder used in the above method is a soluble milk powder.

Generally the beverage preparation apparatus comprises a receiving area in order to removably position the chamber inside the apparatus and to connect the chamber water inlet to the water supply system. Accordingly the chamber can be removed for cleaning and maintenance.

Generally, the beverage preparation apparatus comprises a dosing device configured for dispensing a dose of soluble beverage powder in the chamber.

Generally the dosing device is placed above the chamber in order to feed it by gravity fall. Generally the dosing device can be associated to a powder reservoir.

In the present application the terms "internal", "top", "bottom" and "lateral" are used to describe the relational positioning of features of the invention. These terms should be understood to refer to the chamber in its normal orientation when positioned in a beverage preparation dispenser for the production of a beverage as shown in the FIGS. 1, 2, 4, and 5a.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF THE DRAWINGS

Figure 1:
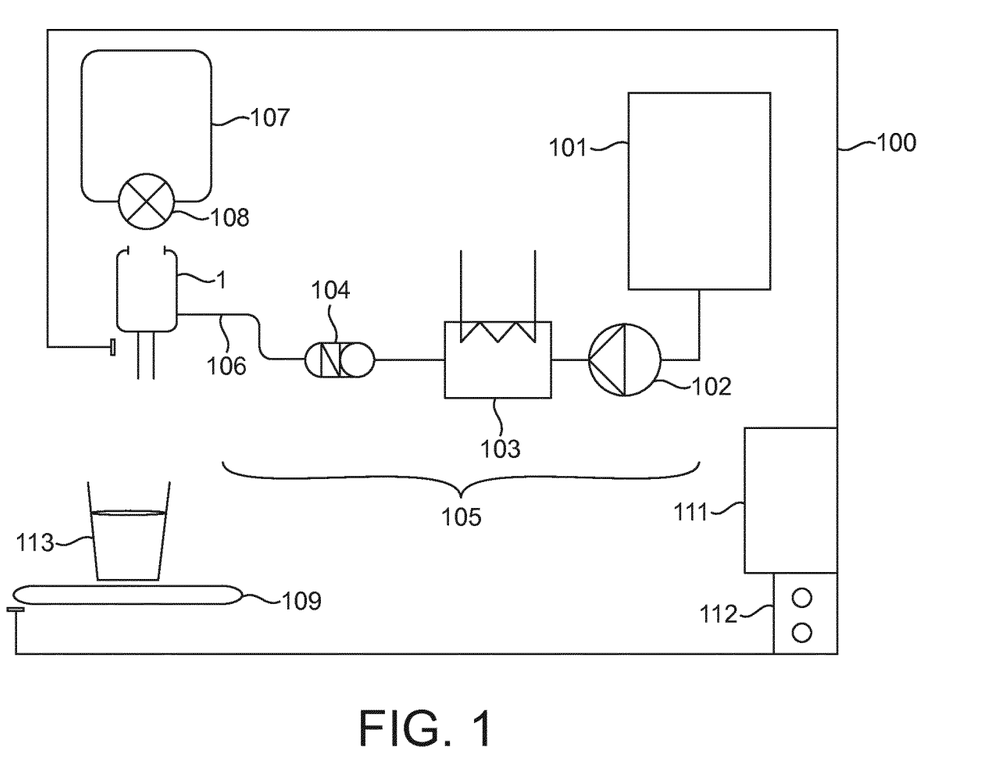
FIG. 1 is a schematic view of a beverage preparation apparatus used in the method of the present invention.

FIG. 1 illustrates a beverage preparation apparatus 100 used in the method of the present invention. The apparatus includes a mixing chamber 1 for producing a beverage from a soluble beverage powder and water entering the chamber.

The beverage powder is stored in a container 107. The container can be a hopper which is permanent or a disposable package containing the beverage powder.

A dose of beverage powder is metered and dispensed by a dosing device 108. The dosing device has the primary function to meter upon request doses of powder into the mixing chamber 1. The dosing device dispenses the dose of beverage powder in the mixing chamber 1, generally by gravity fall in a top opening of the chamber.

The dosing device can be any suitable system such as a dosing screw, a reciprocating dosing drawer or a rotating disc. The dosing technology is also of course dependent on the nature of the soluble powder. The soluble powder is typically a dry beverage powder, preferably milk powder. The device is fed upon request with powder as prompted by a controller 114 and command 112.

This dosing device can be a rotating device such as described in WO 2009/144239 or a translating metering cavity such as described WO 2019/016149.

A water supplying system 105 is provided in the machine to be able to feed water in the mixing chamber 1, more particularly, hot water.

The water supplying system comprises:
- a tank 101 that can be replenished with fresh water, or eventually connected to tap water,
- a water pump 102 for pumping water from the tank 101. The pump can be any type of pump such as a piston pump, diaphragm pump or a peristaltic pump. Preferably, the pump is configured to enable the production of different flow rates of water.
- a water heater 103 such as a thermoblock, a boiler or a cartridge type heater to heat the pumped water, alternatively or in addition to, the machine can comprise a water cooler in a line bypassing the heater,
- a non-return valve 104.

Finally water is fed into the mixing chamber by a tube 106. In a variant, not illustrated, water can be fed by two tubes 106 in two different inlets of the chamber.

As illustrated in FIG. 1, the mixing chamber 1 can be placed directly above a service tray 109 onto which is placed a drinking receptacle 113 to receive the beverage. Generally, the mixing chamber 1 is removable from the machine for cleaning and optionally for dosing.

Usually the machine comprises a mixing chamber receiving area to removably fix the chamber inside and provide cooperation between the mixing chamber water inlet(s) and the water supply tube(s) 106.

Usually, the chamber 2 is immobile within the apparatus. Yet, in a less preferred embodiment, the mixing chamber 1 can be movable to a position placed under the dosing device 108 as described in WO 2009/153157.

The controller 12 can coordinate dosing of the soluble beverage powder by the dosing device 108 and dosing of water by the pump 102 upon the user actuating or being prompted to press the command 112 on the apparatus.

Although not illustrated, the apparatus can comprise a second mixing chamber configured to prepare coffee from soluble coffee powder and water and to dispense said coffee inside the same drinking receptacle 113 too. Accordingly, milk and coffee based beverages, such as a cappuccino or a café latte, can be prepared with this apparatus.

Figure 2:
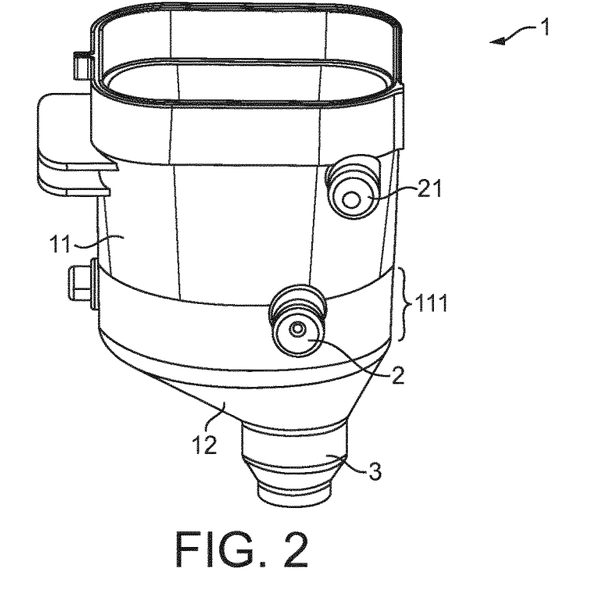
FIG. 2 is a perspective view of a chamber used in the apparatus of FIG. 1.
Figure 3:
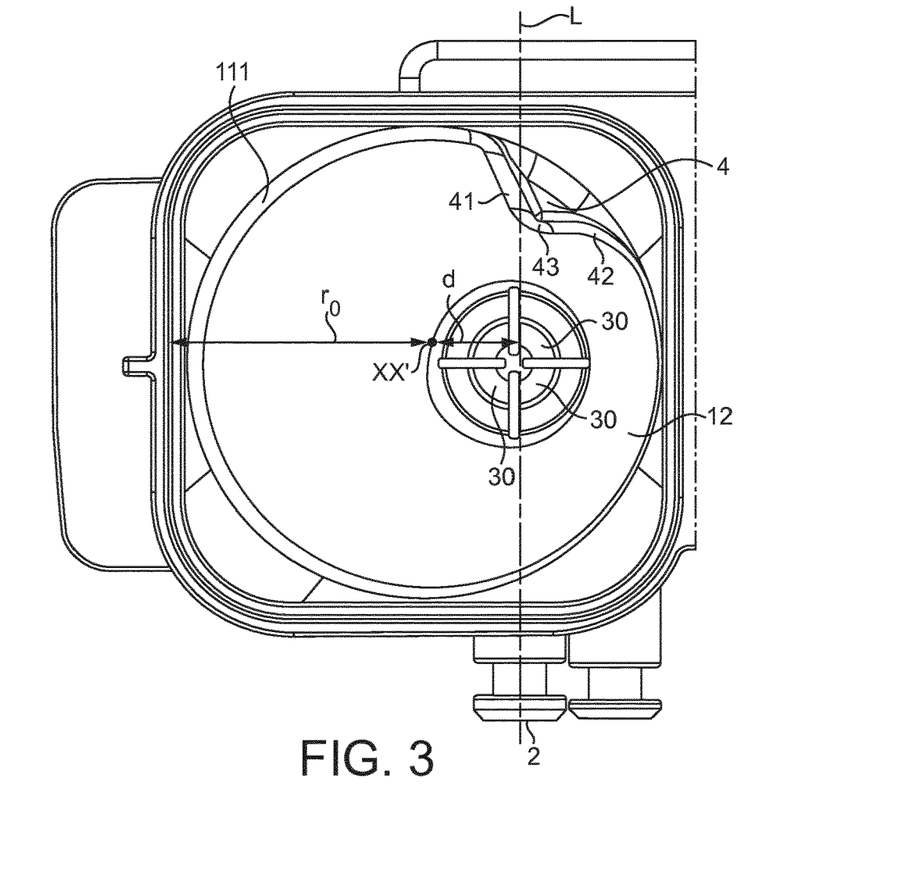
FIG. 3 is a top view of the chamber of FIG. 2.

FIG. 2 is a perspective view of a chamber 1 used in a beverage preparation apparatus such as described in FIG. 1. FIG. 3 is a top view of this chamber. The illustrated chamber enables the preparation of a beverage without the need of a motorised whipping device : powder dissolution and beverage frothing is obtained by a jet of water. The method of the present invention is explained by means of the illustrated chamber, yet it is not limited to. Alternative chambers enabling the preparation and the rapid dispensing of a large volume of beverage can be implemented.

In the preferred illustrated embodiment, the chamber 1 comprises a lateral side wall 11 and a bottom wall 12. These walls define an internal volume able to contain water and beverage during preparation. The lower part 111 of the lateral side wall is preferably cylindrical or close to cylindrical. This lower part comprises the water inlet 2 and a bump 4 at the internal side of the chamber as described later. The upper part of the lateral side changes progressively from the cylindrical cross section to the cross section of a square with rounded corners. This upper shape enables an increase of the internal volume of the chamber. It does not affect the preparation of the beverage that starts and essentially happens in the lower part of the chamber.

Preferably, the cylindrical lateral side wall 11 is such that its longitudinal distance (height) is close to its cross section dimension (diameter). Consequently, the internal volume of the chamber can be relatively important without increasing the height of the chamber and, as a result, the height of the apparatus. The diameter can be comprised between 40 and 70 mm and the height between 40 and 80 mm. The internal volume of the chamber is generally set so as to be able to hold a volume of liquid bigger than 100 ml. Preferably, the internal volume can reach about 135 ml.

The cylindrical lateral side wall 11 comprises a water inlet 2. This water inlet 2 is positioned close to the bottom wall 12 of the chamber (see FIG. 4). Generally, the distance between the bottom of the chamber and the central axis of the water inlet is comprised between 5 and 20 mm.

Figure 4:
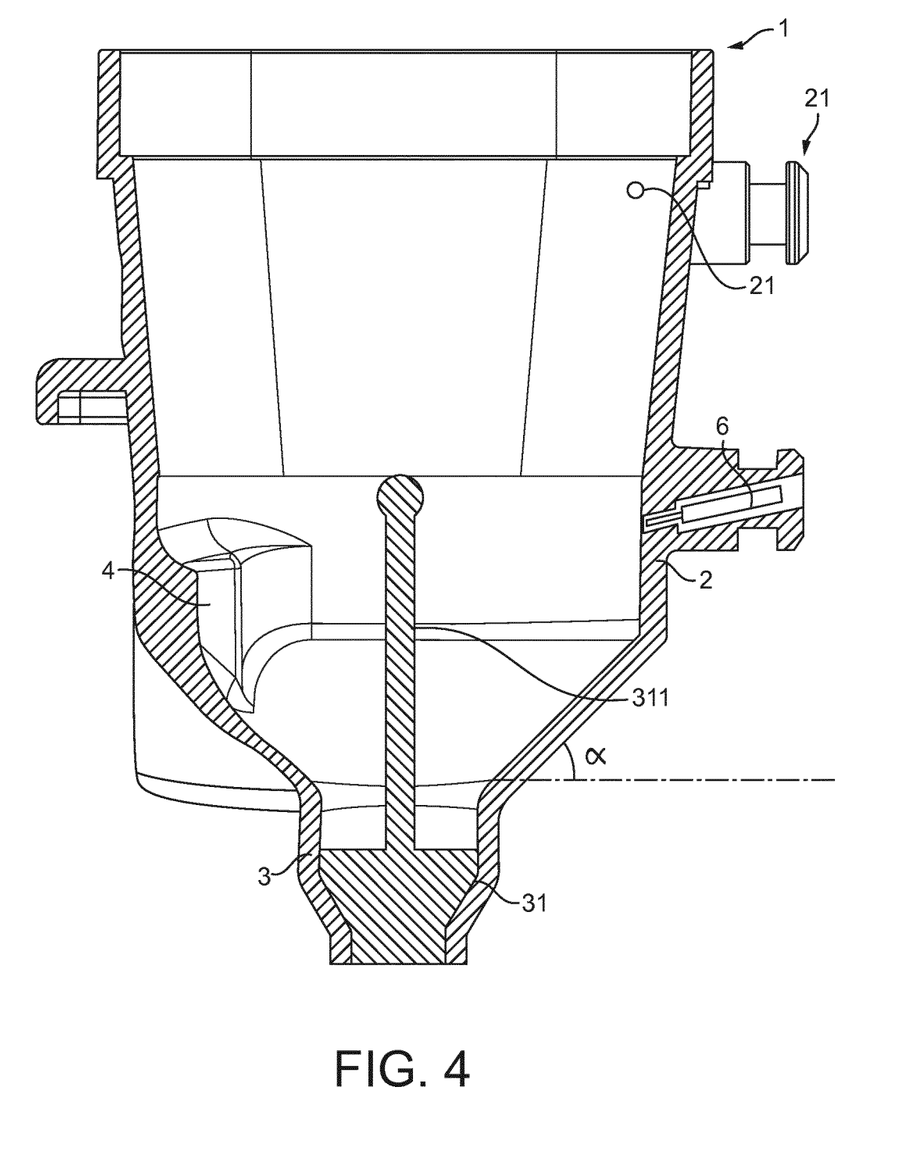
FIG. 4 is a vertical cross section of the chamber of FIG. 2 along the plane traversing the water inlet, FIG. 5a corresponds to FIG. 4, the divider of the beverage outlet being removed.

This water inlet 2 is configured so that the water is introduced in the chamber as a straight jet of water. Preferably, this straight jet is produced by and emerges from a nozzle 6 positioned in the water inlet of the chamber as illustrated in FIG. 4 showing a vertical cross section of the chamber traversing the water inlet.

The water inlet is also configured so that the straight jet of water extends transversely through the internal volume of the chamber along a line L, said line L being offset relative to the longitudinal central axis XX' of the chamber, as illustrated in the top view of the chamber in FIG. 3.

More specifically, the line L is oriented in a direction so that a ratio $d/r_0$ is comprised between 0,2 and 0,4, preferably of about 0,3, where $r_0$ is the radius of the cylindrical lateral side wall 11 and d is the distance measured orthogonally from the line L to the central longitudinal axis XX' of the chamber.

The nozzle 6 positioned in the water inlet 2 is designed for producing a straight jet of water. According to another embodiment, the nozzle can be moulded in the water inlet that is in the chamber lateral side wall.

Generally, the nozzle presents an outlet section with a surface area equivalent to the surface of a circular surface of diameter comprised between 0,2 and 0,8 mm, preferably between 0,3 and 0,5 mm and even more preferably of about 0,4 mm. With such a dimension, the delivery of water at a pressure comprised between 2 and 10 bar, preferably of at least 6 bar, in the nozzle enables the production of a jet of high velocity.

In the illustrated embodiment, the water inlet is also configured so that the straight jet of water is inclined downwardly in direction of the opposed surface of the lateral cylindrical wall. The chamber comprises an optional second water inlet 21 at the top of the chamber. This second water inlet can be used to rinse the chamber or to prepare a non-frothed beverage or to wet the chamber bottom.

The chamber comprises a beverage outlet 3. This outlet is a conduit positioned at the lowest position of the bottom wall 12 of the chamber. The bottom wall 12 presents the shape of a funnel inclined in direction of the conduit. The internal surface of the bottom wall is inclined by an angle a of at least 30° with horizontal, preferably comprised between 30 and 60°. In the illustrated embodiment this angle is of about 40°.

The conduit is not systematically centred on the longitudinal central axis XX' of the cylindrical lateral side wall chamber but can be offset as illustrated in the figures. This illustrated embodiment enables the dispensing of the beverage in a receptacle 113, said receptacle being positioned to receive a beverage dispensed from the outlet of another chamber positioned aside the chamber 1.

In another embodiment wherein there is no such constraint, the chamber the conduit of the beverage outlet can be centred on the longitudinal central axis XX' of the chamber.

The diameter of the conduit of the beverage outlet is sufficiently large to enable the rapid dispensing of a large quantity of the beverage. The hydraulic diameter $D_0$ of the conduit of the beverage outlet is of at about 15 mm.

The combination of the funnel shape of the bottom wall and the large diameter of the beverage conduit creates favourable conditions for the powder to flow directly through the conduit in the drinking receptacle when it is dosed in the chamber, particularly when the chamber is dry.

In the embodiment illustrated in FIGS. 3 and 4, the conduit 3 can be subdivided in four straight sub-conduits 30 by means of a divider 31. This divider prevents the rotation of the swirling beverage inside the beverage conduit which can slow down the dispensing and prevents the dispensing of the beverage as a straight proper flow in the drinking receptacle. The divider 31 is removable from the chamber for cleaning. The divider comprises a rod 311 that an operator can easily catch to remove the divider from the conduit and then reposition it. FIG. 5b illustrates the divided 31 removed from the conduit.

Figure 5A:
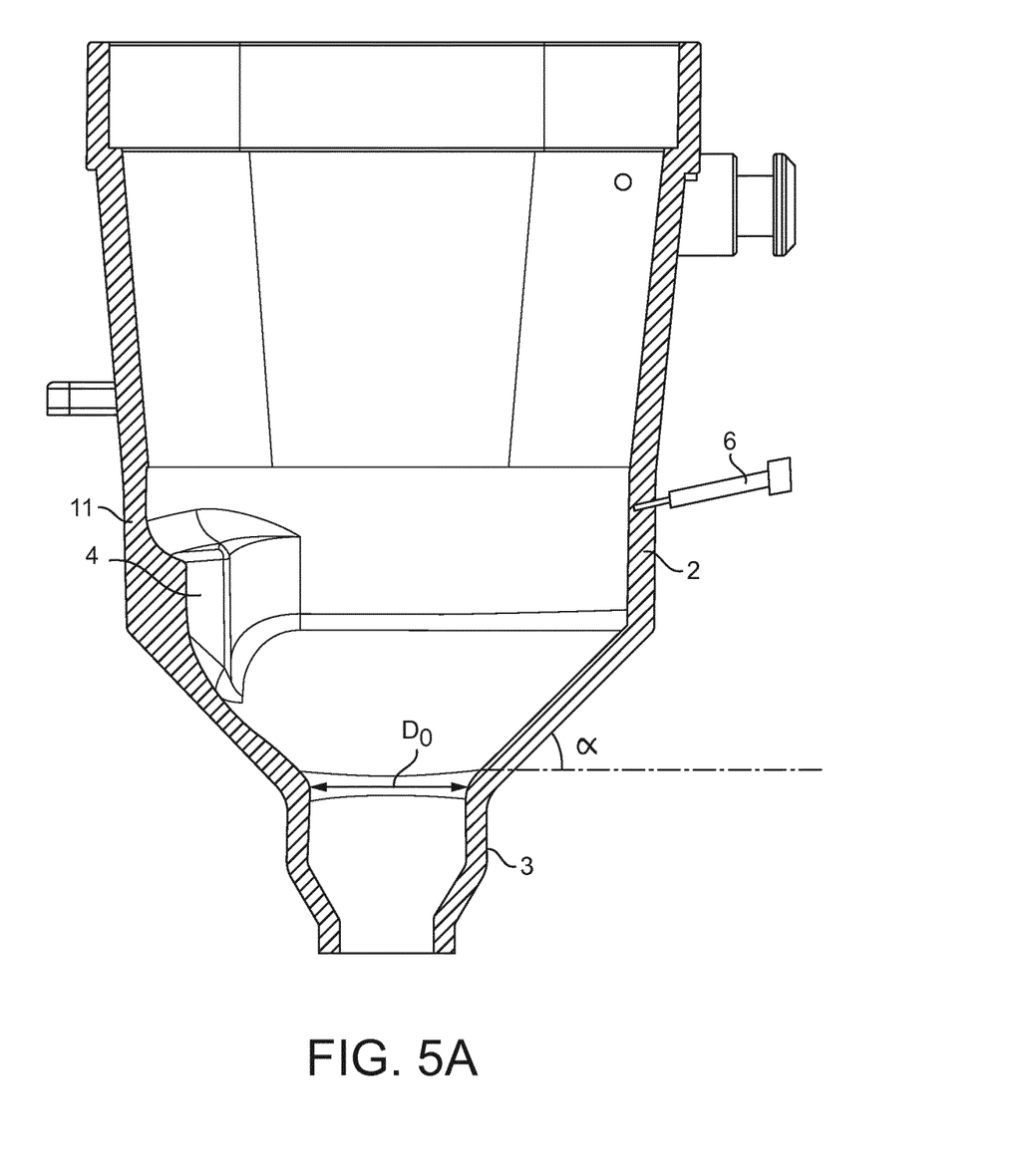
Figure 5B:
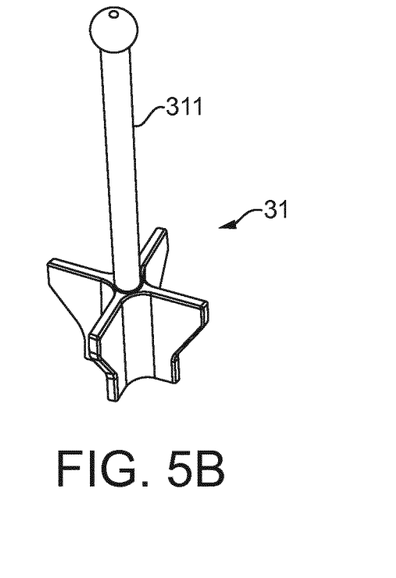
FIG. 5b is a perspective view of the divider.

In the embodiment illustrated in FIGS. 3, 4, 5a, the chamber comprises a bump 4 extending from the lateral surface of the chamber inside the volume of the chamber. This bump enables better dissolution and frothing of the beverage. The bump 4 is positioned at the area of the cylindrical lateral side wall 111 opposed to the water inlet 2. The bump 4 presents two lateral, at least partially, curved sides 41, 42. Each side extend gradually from the surface cylinder in opposite directions and converge at a central common essentially vertical edge 43.

When water is injected, the jet of water reaching the first side 41 of the bump creates a swirl (that rotates counter clockwise in the drawing of FIG. 3). When this swirl passes in front of the water inlet 2, it is agitated and aerated by the entering jet of water as long as water is injected. In addition, as this swirl flows on back to the bump 4, it swirls along the second curve 42 of the bump and it can still be hit again with force by the entering jet of water a second time providing again an efficient agitation. Consequently, the chamber design enables the efficient dissolution of the powder and the frothing of the beverage from the beginning of the process. That provides the advantage of immediately producing an important quantity of foam in the beverage. In order to prepare an important volume of beverage, the chamber can be designed with a quite large diameter, yet the efficient dissolution and frothing effect are still obtained thanks to the liquid circulation imparted by the bump.

Very rapidly, all the beverage powder is dissolved in the water. As water goes on entering the chamber, the swirl raises inside the chamber and above the water inlet. Above the water inlet, the swirl enables the mixing of the beverage in preparation. At the water inlet, the strength of the jet goes on agitating and aerating the swirl.

After a certain time, the volume of water in the chamber is such that the bottom of the swirl reaches the beverage outlet 3 and the dispensing in the drinking receptacle starts. The design of the chamber enables the preparation of a large volume of frothed beverage. Yet, alternative chambers with other internal designs to dissolve and froth can be used.

Figure 6:
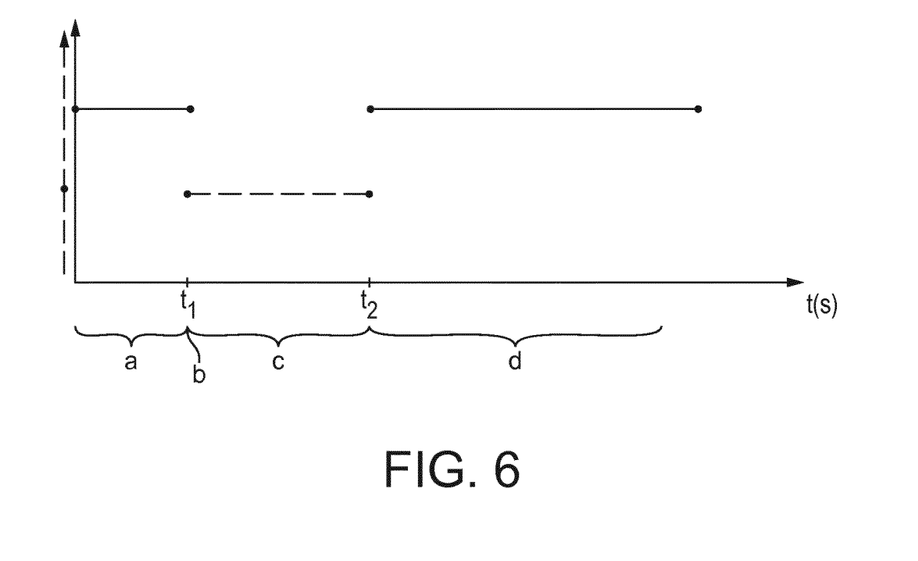
FIG. 6 illustrates the sequences of actuation of the dosing unit and the water pump of the apparatus of FIG. 1 according to the method of the present invention.

FIG. 6 illustrates the method of preparation of a beverage with the apparatus of FIG. 1 and a chamber such as illustrated in FIGS. 2 to 4. The process is used in the condition where no beverage has been prepared for a certain time and the chamber is dry. FIG. 6 shows the sequences of actuation of the powder dosing unit 108 (dotted line) and the water pump 102 (full line) during the time of the a beverage preparation. Following the time, the sequence begins with step a) from t=0 to $t_1$ during which the water pump is actuated. The time length of step a) enables the dispensing of about 2 ml of water through the water nozzle such that water jet forms a swirl of water along the surface of the chamber and wets it. Water pump is stopped at time $t_1$ (step b))

In step c), from $t_1$ to $t_2$, the powder dosing unit is powered to dispense a dose of milk powder inside the chamber. The first part of powder reaching the funnel at the bottom of the chamber reacts with the film of water and is stopped immediately before reaching the beverage outlet conduit. The rest of the powder is retained inside the chamber by this sub-layer. Consequently, no powder falls directly out of the beverage conduit during the powder dosing operation.

In step d), starting from $t_2$, the water pump is actuated again. The time length of step d) and the power of the pump enables the dispensing of water through the water nozzle such that water jet traverses the chamber, hits the opposed lateral wall and forms an ascending swirl of water along the surface of the chamber. Milk powder is dissolved and the resulting milk liquid is frothed.

The apparatus presents the advantage of not comprising costly internal devices such as a motor to close the beverage outlet and optionally a whipping motor to strongly agitate the beverage and a high pressure pump to supply a high pressure.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS chamber 1, 1'
  lateral side wall 11
    top edge 110
    lower part 111
  bottom wall 12
water inlet 2
beverage outlet 3, 3'
sub-conduit 30
divider 31
rod 311
bump 4
first side 41
second side 42
central edge 43
nozzle 6
conduit 9
beverage preparation apparatus 100
tank 101
pump 102
heater 103
valve 104
water supplying system 105
pipe 106
container 107
dosing device 108
service tray 109
command 112
drinking receptacle 113
controller 114

The invention claimed is:

1. A method for producing a beverage by dissolution of a soluble beverage powder with water in a beverage preparation apparatus, the beverage preparation apparatus comprising:
  at least one chamber for receiving and mixing a dose of the soluble beverage powder with the water, the at least one chamber comprising:
    an opened top to receive the dose of the soluble beverage powder;
    a lateral side wall, the lateral side wall comprising a water inlet; and
    a bottom wall, the bottom wall comprising a beverage outlet conduit;
    the water inlet and an internal shape of the at least one chamber are configured so that the water introduced through the water inlet is able to form a swirl inside the at least one chamber;
  wherein the bottom wall presents the shape of a funnel inclined in direction of the beverage outlet conduit;
  the beverage outlet conduit presents a hydraulic diameter of at least 5 mm,
  wherein the funnel is inclined by an angle of at least 30° with horizontal;
the method comprising:
  a) introducing water through the water inlet to only wet an internal surface of the funnel of the bottom wall, then
  b) stopping the introduction of the water, then
  c) introducing the dose of the soluble beverage powder in the at least one chamber, and then
  d) introducing the water in the at least one chamber to dissolve the soluble beverage powder.

2. The method according to claim 1, wherein, in the wetting step a), the water is introduced in the at least one chamber through the water inlet at a flow rate configured to create a swirl of the water along the internal surface of the funnel of the bottom wall.

3. The method according to claim 1, wherein, in the dissolution step d), the water is introduced in the at least one chamber at a flow rate configured to create an ascending swirl of the water.

4. The method according to claim 1, wherein the soluble beverage powder is a milk powder.

5. The method according to claim 1, wherein the at least one chamber presents an internal volume of at least 100 ml and the hydraulic diameter of the beverage outlet conduit is of at least 5 mm.

6. The method according to claim 1, wherein the beverage outlet conduit does not include any closing means.

7. The methodMethod according to claim 1, wherein the beverage preparation apparatus comprises:
   a water supply system connectable to the water inlet, and
   a dosing device configured for dispensing the dose of the soluble beverage powder in the at least one chamber.

8. The method according to claim 1, wherein, in the at least one chamber of the beverage preparation apparatus:
   the water inlet is positioned close to the bottom of the at least one chamber, and
   the water inlet is configured so that the water is introduced in the at least one chamber as a straight jet of water, the introduced straight jet of water extending transversely through the internal volume of the at least one chamber along a line L, the line L being offset relative to the longitudinal central axis of the at least one chamber,
   at the area of the cylindrical lateral side wall opposed to the water inlet and crossed by the line L, the chamber comprises a bump extending from the cylindrical lateral side wall inside the at least one chamber, the bump presenting a shape designed:
   to convert the introduced straight jet of water extending transversely through the internal volume of the chamber into a swirl flowing along the lateral side wall off the chamber, and
   to reduce the diameter of the swirl rotating back to the bump and to guide the swirl in direction of the water inlet, during the step d) of introducing water in the chamber to dissolve the powder.

9. The method of claim 1, wherein after introducing the dose of the soluble beverage powder in the at least one chamber, the soluble beverage powder reacts with the water on the internal surface of the funnel of the bottom wall and is stopped before reaching the beverage outlet conduit.

10. The method of claim 1, wherein, in the wetting step a), the water is introduced in a quantity to avoid drops of the water from flowing out of the beverage conduit.

11. The method of claim 7, wherein the water supply system comprises a tank, a water pump configured to pump water from the tank, and a water heater to heat the water pumped from the tank, and a non-return valve.

12. The method of claim 1, wherein the water inlet comprises a nozzle configured for producing the straight jet of water, wherein a diameter of the nozzle is between 0.2 and 0.8 mm.

13. The method of claim 1, wherein the beverage outlet conduit is subdivided into four conduits by a divider.

14. The method of claim 8, wherein the bump comprises two partially curved sides, wherein each side extends from the lateral side wall and converges at a common edge.

* * * * *